(12) United States Patent
Schambre et al.

(10) Patent No.: US 6,601,901 B1
(45) Date of Patent: Aug. 5, 2003

(54) FOLD FLAT MOTOR VEHICLE SEAT

(75) Inventors: John E Schambre, Canton, MI (US); Rudi Krajcirovic, Royal Oak, MI (US); Marcus G Washington, Southfield, MI (US); Liliana Neag, Walled Lake, MI (US); Louis D DeLellis, South Lyon, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/175,564

(22) Filed: Jun. 17, 2002

(51) Int. Cl.[7] .................................................. B60N 2/12
(52) U.S. Cl. ....................... 296/65.09; 296/69; 297/316; 297/344.1
(58) Field of Search ........................... 296/65.01, 65.05, 296/65.09, 65.13, 65.14, 65.15, 65.16, 69; 297/316, 344.1, 378.1, 320, 321, 322

(56) References Cited

U.S. PATENT DOCUMENTS

| 4,519,646 A | | 5/1985 | Leitermann et al. |
| 4,572,569 A | | 2/1986 | Habmann |
| 4,636,002 A | * | 1/1987 | Genjiro ....................... 297/319 |
| 4,779,917 A | | 10/1988 | Campbell et al. |
| 4,877,282 A | | 10/1989 | Yamauchi |
| 5,269,581 A | | 12/1993 | Odagaki et al. |
| 5,482,346 A | | 1/1996 | Lesourd |
| 5,492,389 A | | 2/1996 | McClintock et al. |
| 5,622,406 A | * | 4/1997 | Meschkat et al. ........... 297/318 |
| 5,868,451 A | | 2/1999 | Uno et al. |
| 5,975,612 A | * | 11/1999 | Macey et al. .................. 296/66 |
| 6,135,558 A | * | 10/2000 | Behrens et al. .............. 297/353 |
| 6,234,553 B1 | * | 5/2001 | Eschelbach et al. ...... 296/65.14 |
| 6,270,141 B2 | * | 8/2001 | Moon et al. ............. 296/65.17 |
| 6,347,834 B1 | * | 2/2002 | Couasnon ................... 297/341 |

* cited by examiner

Primary Examiner—D. Glenn Dayoan
Assistant Examiner—Patricia Engle
(74) Attorney, Agent, or Firm—Donald J. Wallace

(57) ABSTRACT

A seat assembly for a motor vehicle including at least one J-shaped bracket movable toward and away from a front of the vehicle, a pivot rod engaging the at least one J-shaped bracket, and a seat cushion frame connected to the at least one J-shaped bracket. At least one link is attached to the seat frame and attached to the floor of the vehicle, and at least one guide bracket is mounted to the vehicle floor. The guide bracket has an arcuate slot engagable with the pivot rod as the J-shaped bracket moves toward the front of the vehicle to pivot the J-shaped bracket.

20 Claims, 7 Drawing Sheets

FOLD FLAT MOTOR VEHICLE SEAT

TECHNICAL FIELD OF THE INVENTION

This invention relates generally to seats for motor vehicle seats, and relates more specifically to a seat that folds to provide a flat surface.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage. Typically, locking mechanisms are provided for holding the seat in the seating configuration, and the locking mechanisms can be released to permit moving the seat to the load floor configuration.

A variety of designs have also been proposed to provide a seat that facilitates ingress to and egress from the vehicle. U.S. Pat. No. 5,492,389 shows a stowable seat having a cantilevered seatbase with a range of motion extending from a horizontally deployed position to a vertically stowed position.

SUMMARY OF THE INVENTION

The present invention is a seat assembly for a motor vehicle. The seat assembly comprises at least one J-shaped bracket movable toward and away from a front of the vehicle, a pivot rod engaging the at least one J-shaped bracket, and a seat cushion frame connected to the at least one J-shaped bracket. At least one link is attached to the seat frame and attached to the floor of the vehicle, and at least one guide bracket is mounted to the vehicle floor. The guide bracket has an arcuate slot engagable with the pivot rod as the J-shaped bracket moves toward the front of the vehicle to pivot the J-shaped bracket.

Accordingly, it is an object of the present invention to provide a seat assembly of the type described above which can be moved to a seating configuration and to a load floor configuration.

Another object of the present invention is to provide an assembly of the type described above that enables easier ingress and egress for back row seat occupants.

Still another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
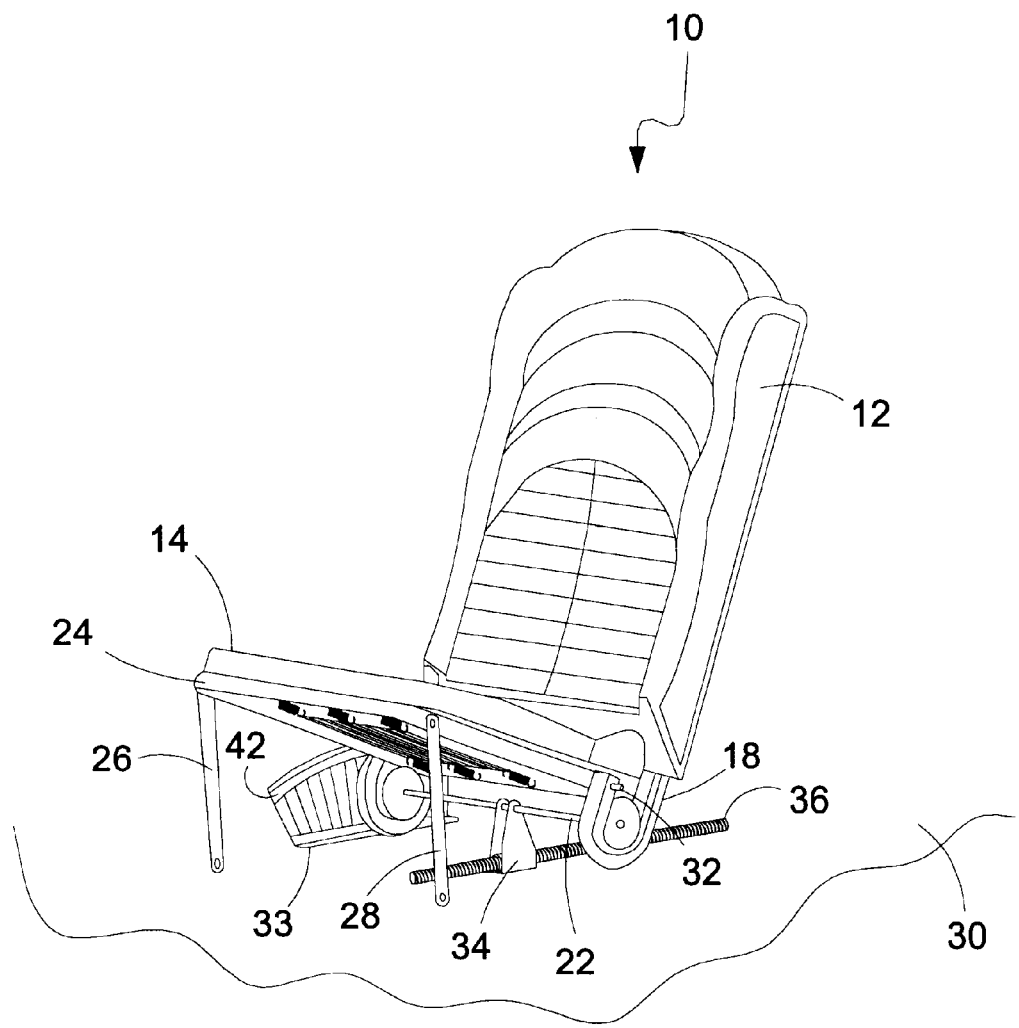
FIG. 1 is a perspective view of a seat assembly according to the present invention in an upright, use position with a guide bracket removed for clarity.
Figure 2:
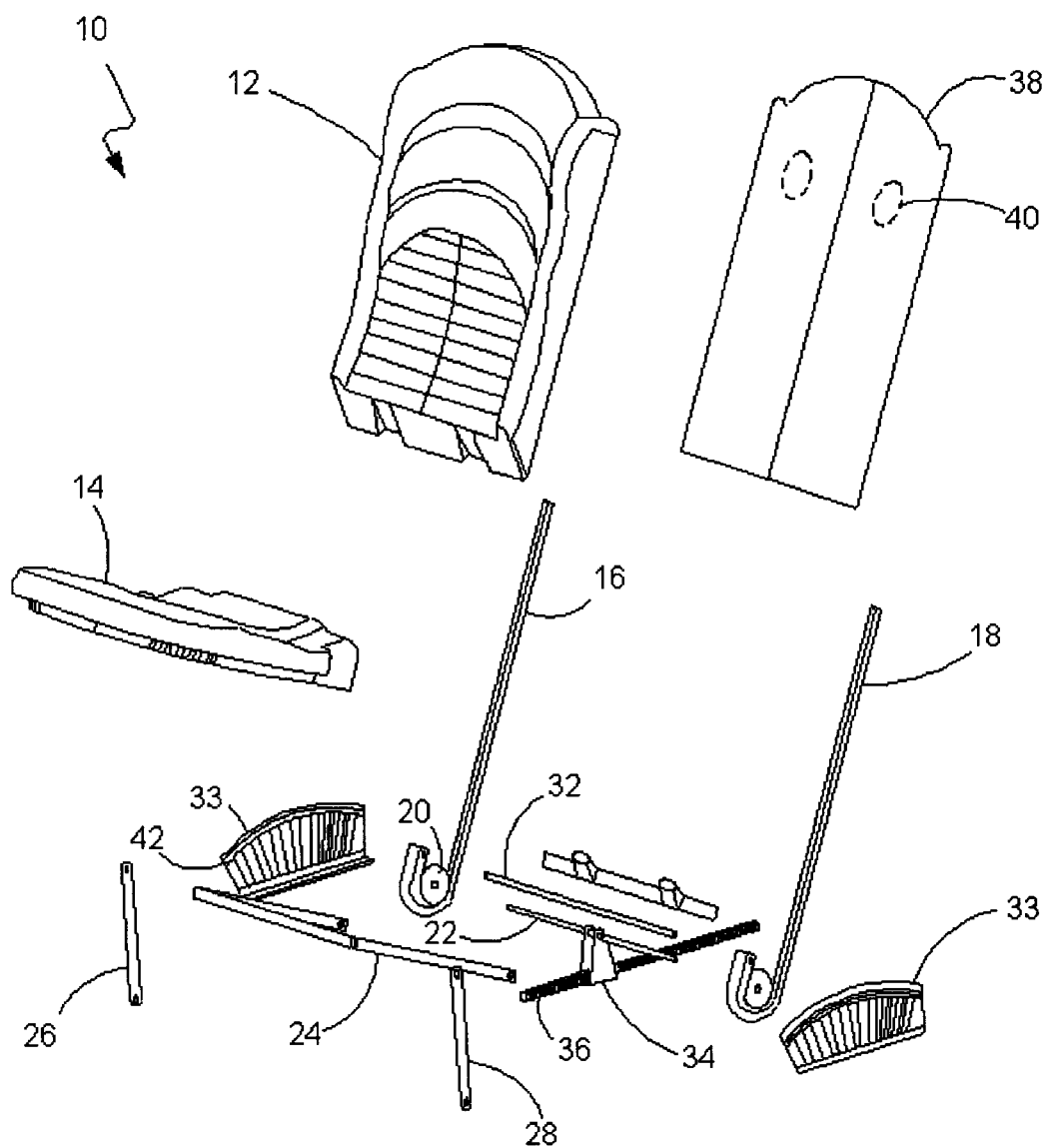
FIG. 2 is an exploded perspective view of the seat assembly.

FIG. 1 shows one embodiment of a seat assembly 10 according to the present invention for a motor vehicle. The seat assembly 10 includes a seatback 12 and a seat cushion 14. The seatback 12 normally assumes a use position, as shown in FIG. 1, in which the seatback 12 is generally upright in order to support the back of an occupant. As shown in FIG. 2, the seatback 12 is attached to the long portions of a pair of J-shaped brackets 16 and 18. A receiver 20 is mounted in the crook of each of the brackets 16 and 18, and receives the opposite ends of a transversely oriented drive rod 22. As explained in greater detail below, the seatback 12 is pivotable about the axis defined by the drive rod 22 from the upright position toward positions more closely proximate the seat cushion 14.

The seat cushion 14 is mounted on a U-shaped frame 24. A pair of links 26 and 28 are pivotably attached near the front of the seat frame 24. At their opposite lower ends, the links 26 and 28 are pivotably attachable to a floor 30 of the vehicle. The distal portions of the frame 24 are pivotably connected to a pivot rod 32. The opposite ends of the pivot rod 32, in turn, are received through the upper portions of the lower distal ends of the J-brackets 16 and 18. A pair of guide brackets 33, only one of which is shown in FIG. 1 for clarity, are mounted to the vehicle floor 30.

Figure 3A:
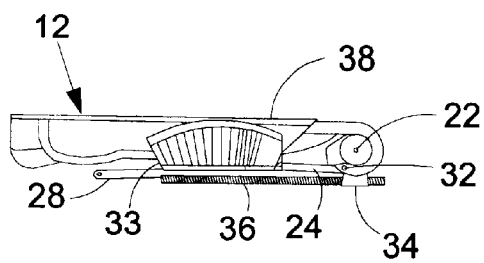
FIGS. 3A through 3H are a series of side views showing a range of motion of the seat assembly.

The drive rod 22 extends through a follower 34 mounted for linear translation on a ball screw 36. The ball screw 36 is rotatable, either manually or by a motor, to move the follower 34 from a rearwardmost position shown in FIG. 3A, through the positions shown in FIGS. 3B, 3C, 3D, 3E, 3F, and 3G, and to a forwardmost position shown in FIG. 3H. In the position shown in FIG. 3A, the seatback 12 overlies the seat cushion 14 such that a generally planar seatback rear trim panel 38 is essentially parallel to the floor 30 of the vehicle. As a convenience, the trim panel 38 may be provided with indentations 40 shown in FIG. 2 to accept cups or other items.

Figure 3B:
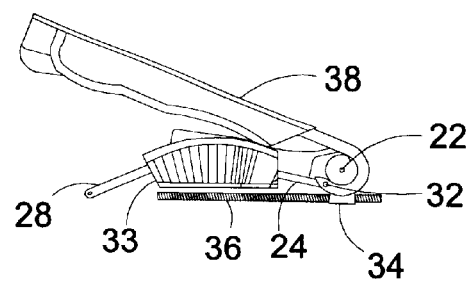
Figure 3C:
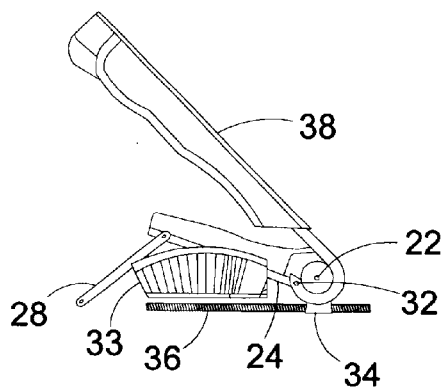
Figure 3D:
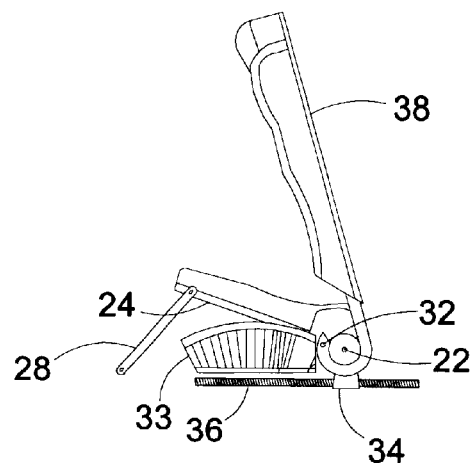
Figure 3E:
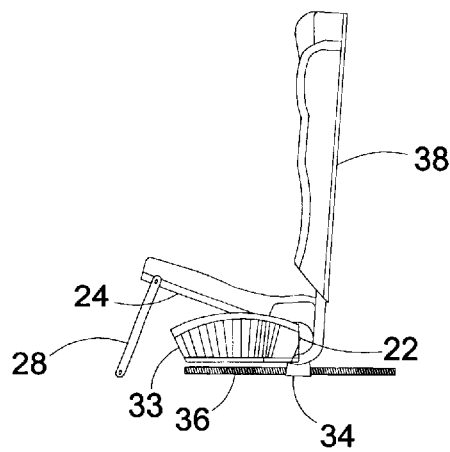
Figure 3F:
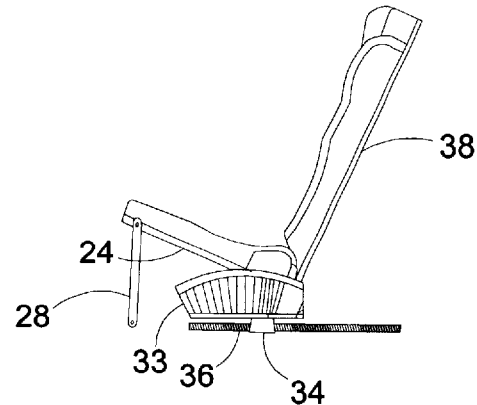
Figure 3G:
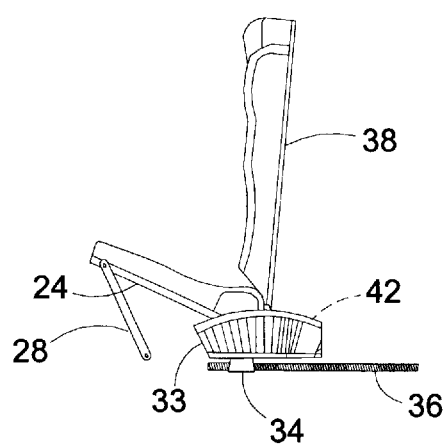
Figure 3H:
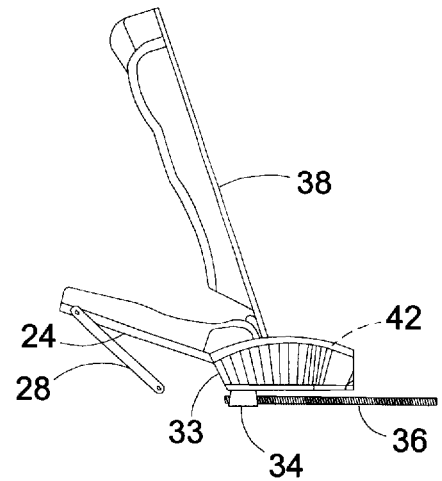

As the follower 34 moves toward the front of the vehicle as shown in FIGS. 3B and 3C, both the seatback 12 and the seat cushion 14 assume greater angles of orientation with respect to the horizontal. The ends of the pivot rod 32, which extend outside of the J-brackets 16 and 18 as shown in FIG. 1, enter arcuate slots 42 in the guide brackets 33 when the follower 34 travels just beyond the position shown in FIG. 3D. Further forward movement of the follower 34, as shown in FIG. 3E, raises the rear of the seat cushion 14 with respect to the floor 30. The front of the seat cushion 14 is also raised through this entire range of initial motion as the links 26 and 28 approach vertical. The overall height of the seat cushion is at a maximum when the links 26 and 28 are vertical and the ends of the pivot rod 32 are at the highest point in the slots 42, as shown in FIG. 3F. It should be appreciated, of course, that the maximum points of elevation of the front and rear of the seat cushion 14 do not need to coincide.

The follower 34 may be held in any position along the ball screw 36 in order to orient the seat assembly 10 according to the desire of the occupant. To facilitate ingress and egress behind the seat assembly, the follower may move further forward through the positions shown in FIGS. 3G and 3H. Through these positions, the ends of the pivot rods 32 descend slightly with respect to the floor as they move through the front half of the slots 42. This action causes the J-brackets 16 and 18 to rotate counterclockwise as shown in the drawings, and in turn the seatback 12 pivots toward the front of the vehicle. The ultimate position of the seatback 12, shown in FIG. 3H, affords easier ingress and egress behind the seat assembly.

Figure 4:
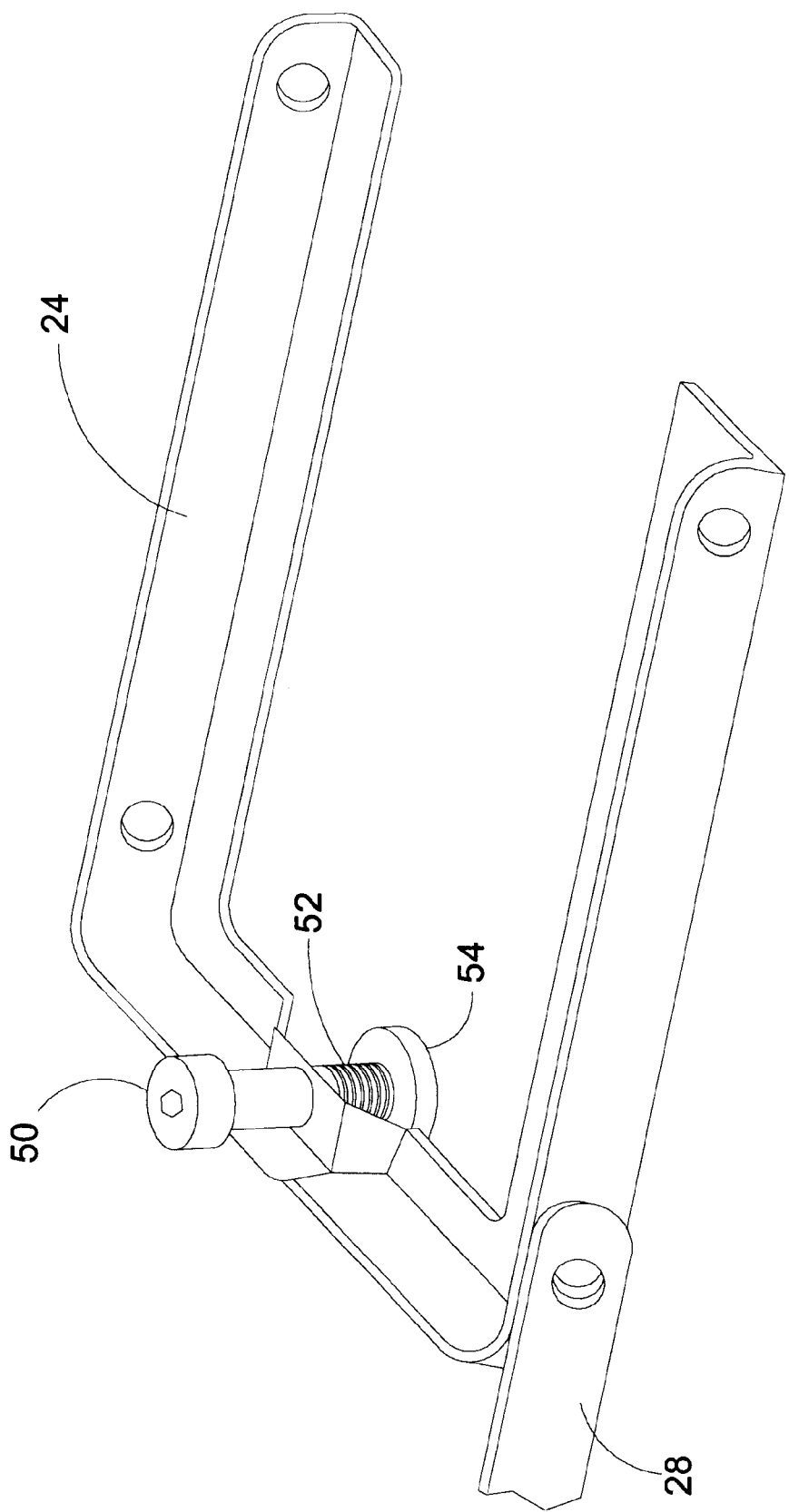
FIG. 4 is a perspective view of a seat frame bumper for use with the seat assembly.

The seat assembly is optionally provided with one or more mechanisms to initially bias it away from the fully folded flat position shown in FIG. 3A. FIG. 4 shows one such mechanism for biasing the frame 24 and the link 28 away from the floor of the vehicle. A hexagonal socket shoulder screw 50 extends through the frame 24, and traps a compression spring 52 between the underside of the frame and a push-off bumper 54. The bumper 54 is adapted to rest on the floor of the vehicle when the seat assembly is folded flat, and to bias the frame 24 and the links 26 and 28 away from the floor.

Figure 5:
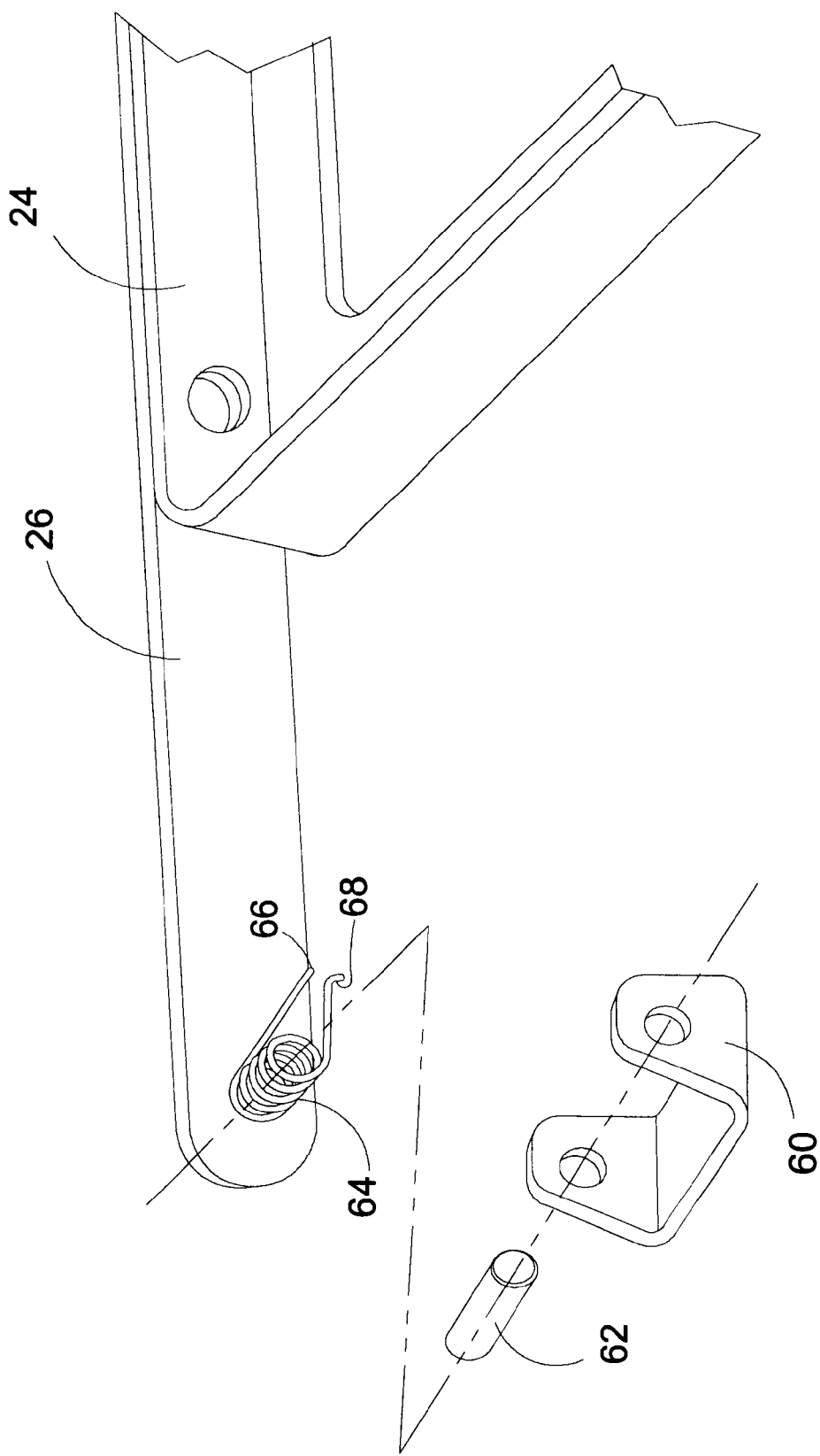
FIG. 5 is an exploded perspective view of a link bracket for the seat assembly.

FIG. 5 shows a mechanism for biasing the links 26 and 28 away from the horizontal. The links 26 and 28 are each rotatably mounted to a bracket 60 by a pin 62, and the brackets are secured to the floor of the vehicle. A spring 64 is disposed around the pin 62, and has one end 66 hooked below the link 26 and another end 68 hooked around the mounting bracket 60. The spring 64 provides a bias tending to rotate the link 26 counterclockwise as shown so as to raise the distal end of the link away from the floor of the vehicle.

Figure 6:
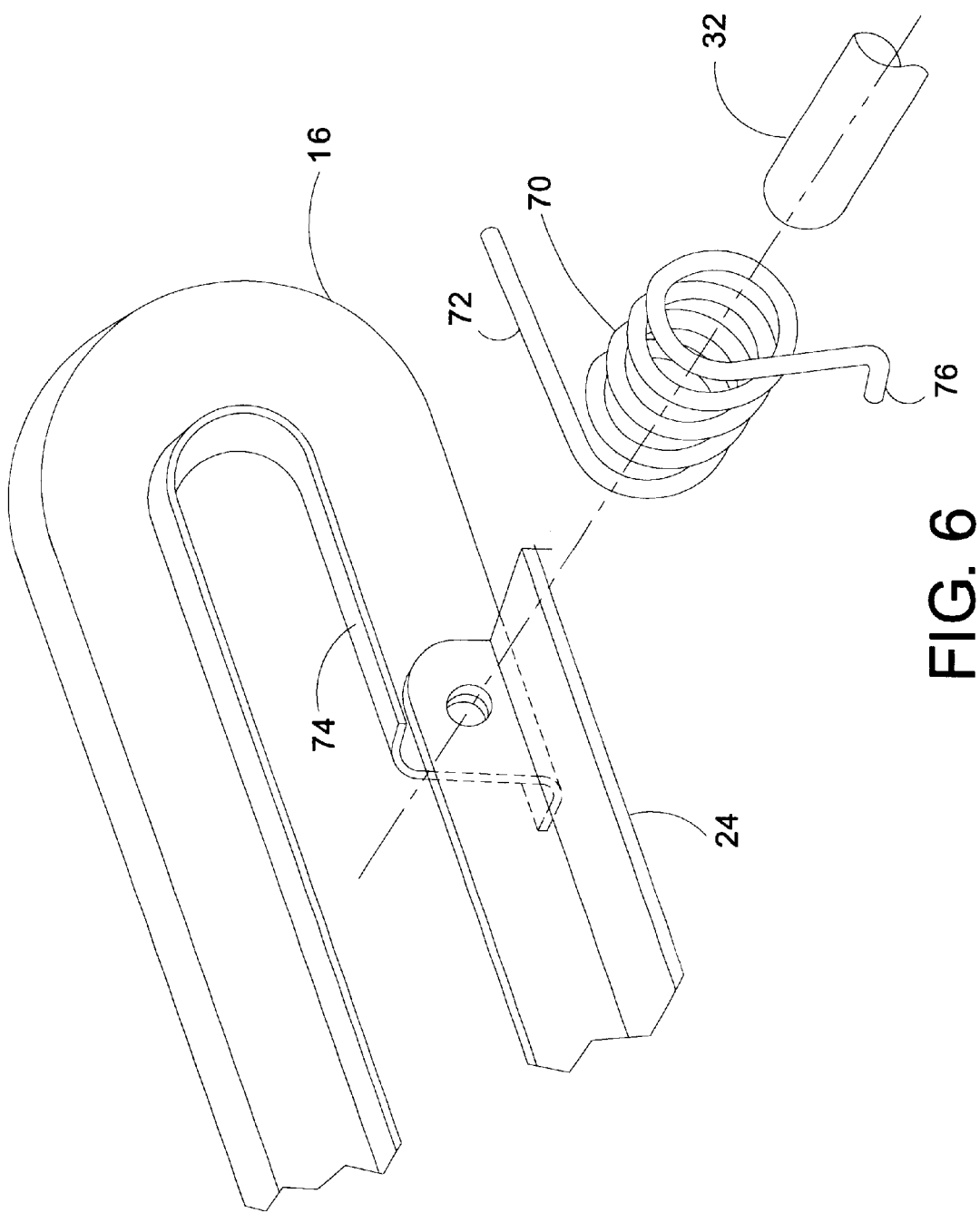
FIG. 6 is an exploded perspective view of a spring assembly for use with the seat assembly.

FIG. 6 shows a mechanism for biasing the J-brackets away from the seat frame 24. Similar to the mechanism shown in FIG. 5, a spring 70 is disposed around the rod 32 and has one end 72 adapted to engage the upper surface 74 of a flange on the J-bracket 16, and an opposite end 76 adapted to hook below the seat frame 24. The spring 70 provides a bias tending to rotate the J-bracket 16 away from the generally horizontal orientation that it assumes when the seat assembly is folded flat.

The present invention thus provides a seat assembly that moves between a seating configuration and a configuration allowing the presentation of a relatively flat load floor. Moreover, the present invention is a cost effective method of facilitating ingress and egress for occupants of the rear seating row(s) of the motor vehicle.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A seat assembly for a motor vehicle having a floor, the seat assembly comprising:
   at least one J-shaped bracket movable toward and away from a front of the vehicle;
   a pivot rod engaging the at least one J-shaped bracket;
   a seat cushion frame connected to the at least one J-shaped bracket;
   at least one link attached to the seat frame and attached to the floor of the vehicle; and
   at least one guide bracket mounted to the vehicle floor, the guide bracket having an arcuate slot engagable with the pivot rod as the J-shaped bracket moves toward the front of the vehicle to pivot the J-shaped bracket.

2. The seat assembly of claim 1 further comprising a drive rod engaging the at least one J-shaped bracket.

3. The seat assembly of claim 2 further comprising a ball screw engaging the drive rod to move the J-shaped bracket toward and away from the front of the vehicle.

4. The seat assembly of claim 3 wherein the drive rod engages a follower mounted for linear translation on the ball screw.

5. The seat assembly of claim 1 further comprising a seatback mounted on the at least one J-shaped bracket, the seatback assuming a generally horizontal position when the J-shaped bracket is moved fully away from the front of the vehicle.

6. The seat assembly of claim 1 wherein the seat cushion frame is pivotably connected to the at least one J-shaped bracket.

7. The seat assembly of claim 1 wherein the at least one link is pivotably attached to the seat frame and pivotably attached to the floor of the vehicle.

8. A seat assembly for a motor vehicle having a floor, the seat assembly comprising:
   a pair of J-shaped brackets movable toward and away from a front of the vehicle;
   a pivot rod engaging the J-shaped brackets;
   a seat cushion frame connected to J-shaped brackets;
   a pair of links attached to the seat frame and attached to the floor of the vehicle; and
   a pair of guide brackets mounted to the vehicle floor, each guide bracket having an arcuate slot engagable with the pivot rod as the J-shaped brackets move toward the front of the vehicle to pivot the J-shaped brackets.

9. The seat assembly of claim 8 further comprising a drive rod engaging the J-shaped brackets.

10. The seat assembly of claim 9 further comprising a ball screw engaging the drive rod to move the J-shaped brackets toward and away from the front of the vehicle.

11. The seat assembly of claim 10 wherein the drive rod engages a follower mounted for linear translation on the ball screw.

12. The seat assembly of claim 8 further comprising a seatback mounted on the J-shaped bracket, the seatback assuming a generally horizontal position when the J-shaped brackets are moved fully away from the front of the vehicle.

13. The seat assembly of claim 8 wherein the seat cushion frame is pivotably connected to the J-shaped brackets.

14. The seat assembly of claim 8 wherein the links are pivotably attached to the seat frame and pivotably attached to the floor of the vehicle.

15. A seat assembly for a motor vehicle having a floor, the seat assembly comprising:
   a pair of J-shaped brackets;
   a drive rod engaging the J-shaped brackets to move the J-shaped brackets toward and away from a front of the vehicle;
   a pivot rod engaging the J-shaped brackets;
   a seat cushion frame connected to pivot rod;
   a pair of links attached to the seat frame and attached to the floor of the vehicle; and
   a pair of guide brackets mounted to the vehicle floor, each guide bracket having an arcuate slot engagable with the pivot rod as the J-shaped brackets move toward the front of the vehicle to pivot the J-shaped brackets.

16. The seat assembly of claim 15 further comprising a ball screw engaging the drive rod to move the J-shaped brackets toward and away from the front of the vehicle.

17. The seat assembly of claim 16 wherein the drive rod engages a follower mounted for linear translation on the ball screw.

18. The seat assembly of claim 15 further comprising a seatback mounted on the J-shaped bracket, the seatback assuming a generally horizontal position when the J-shaped brackets are moved fully away from the front of the vehicle.

19. The seat assembly of claim 15 wherein the seat cushion frame is pivotably connected to the J-shaped brackets.

20. The seat assembly of claim 15 wherein the links are pivotably attached to the seat frame and pivotably attached to the floor of the vehicle.

* * * * *